United States Patent
Alahyari

(10) Patent No.: US 12,163,467 B2
(45) Date of Patent: Dec. 10, 2024

(54) CONDENSER FOR HYDROGEN STEAM INJECTED TURBINE ENGINE

(71) Applicant: Raytheon Technologies Corporation, Farmington, CT (US)

(72) Inventor: Abbas A. Alahyari, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 64 days.

(21) Appl. No.: 17/744,340

(22) Filed: May 13, 2022

(65) Prior Publication Data

US 2023/0366348 A1    Nov. 16, 2023

(51) Int. Cl.
*F02C 3/30* (2006.01)
*F02C 7/14* (2006.01)
*F02C 7/22* (2006.01)

(52) U.S. Cl.
CPC ............... *F02C 3/305* (2013.01); *F02C 7/14* (2013.01); *F02C 7/222* (2013.01); *F05D 2220/323* (2013.01); *F05D 2240/35* (2013.01); *F05D 2250/15* (2013.01); *F05D 2260/211* (2013.01); *F05D 2260/212* (2013.01); *F05D 2260/213* (2013.01); *F05D 2260/2322* (2013.01); *F05D 2260/60* (2013.01)

(58) Field of Classification Search
CPC ...... F02C 3/305; F02C 6/18; F05D 2260/212; F05D 2260/213
See application file for complete search history.

(56) References Cited

U.S. PATENT DOCUMENTS

| | | |
|---|---|---|
| 2015/0198380 A1* | 7/2015 | Haj-Hariri .............. F28D 15/02 62/3.2 |
| 2021/0001269 A1 | 1/2021 | Klingels |
| 2021/0207500 A1 | 7/2021 | Klingels et al. |

FOREIGN PATENT DOCUMENTS

| | | |
|---|---|---|
| EP | 3048281 A1 | 7/2016 |
| GB | 2531632 A | 4/2016 |

OTHER PUBLICATIONS

European Search Report for European Application No. 23173241.3 mailed Sep. 21, 2023.

* cited by examiner

*Primary Examiner* — Arun Goyal
(74) *Attorney, Agent, or Firm* — Carlson, Gaskey & Olds, P.C.

(57) ABSTRACT

A propulsion system for an aircraft includes a hydrogen fuel system supplying hydrogen fuel to the combustor through a fuel flow path. A condenser extracts water from an exhaust gas flow and includes a plurality of spiral passages disposed within a collector. The spiraling passages generate a transverse pressure gradient to direct water out of the exhaust gas flow toward the collector.

16 Claims, 5 Drawing Sheets

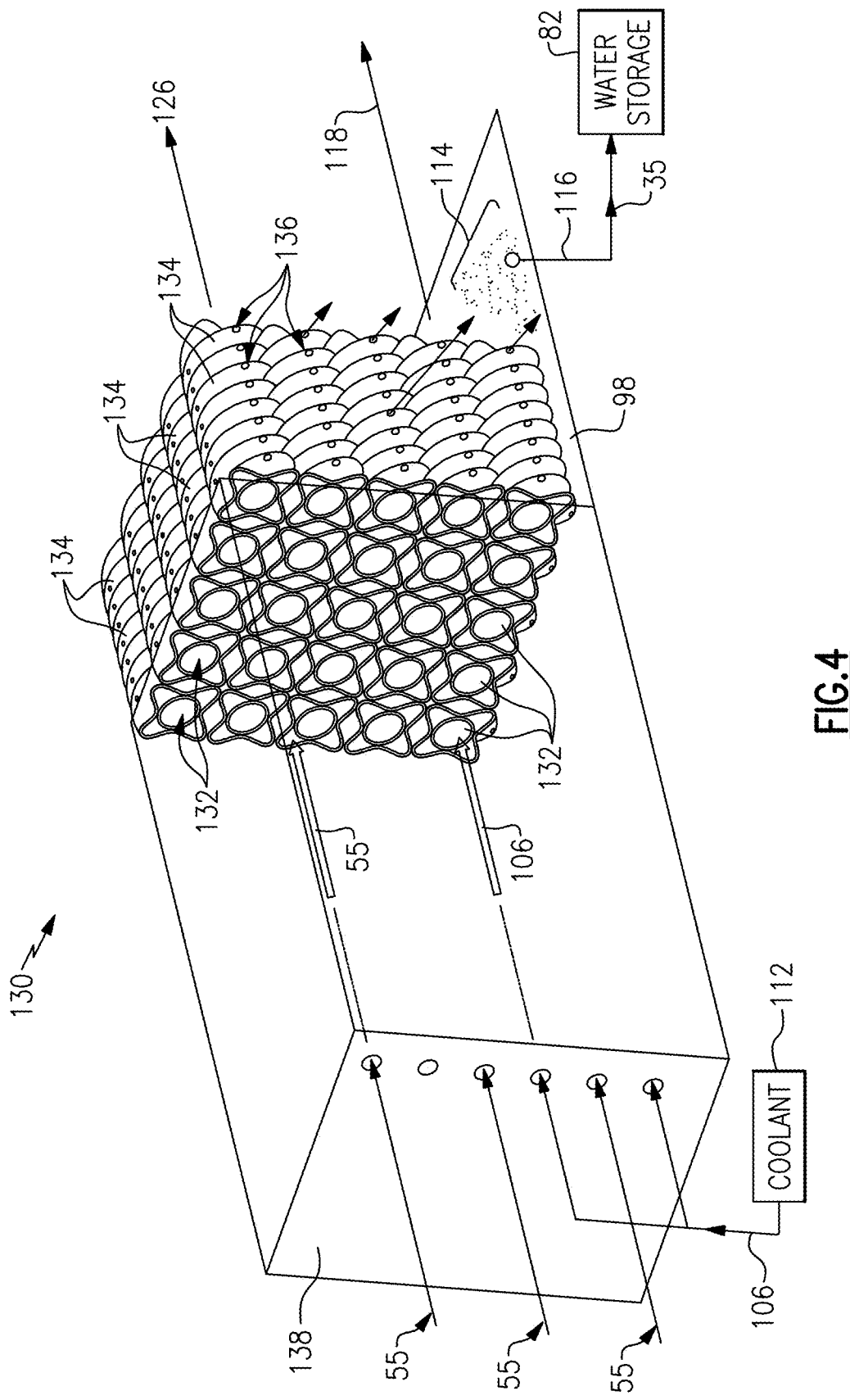

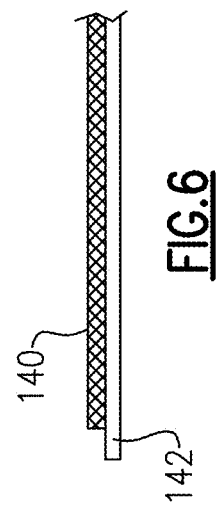
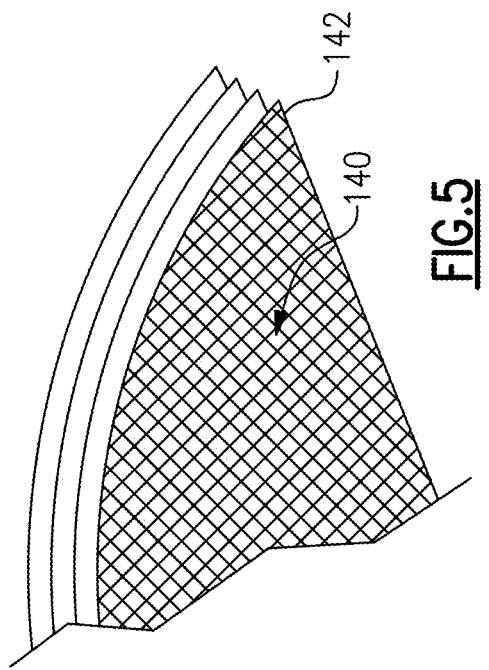
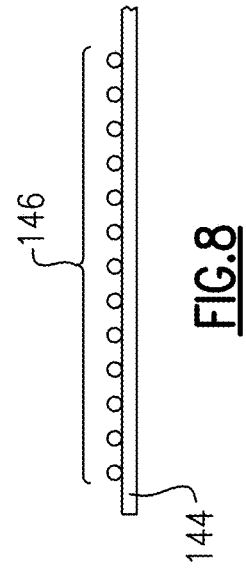
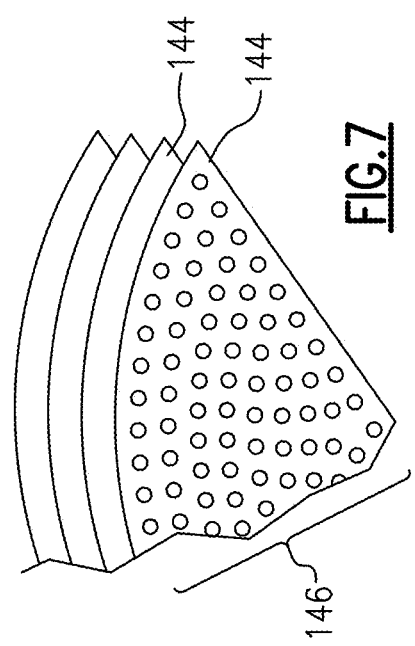

US 12,163,467 B2

CONDENSER FOR HYDROGEN STEAM INJECTED TURBINE ENGINE

TECHNICAL FIELD

The present disclosure relates generally to a hydrogen powered aircraft propulsion system and, more particularly to hydrogen steam injected and intercooled turbine engine.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine Turbine engine manufacturers continue to seek further improvements to engine performance including improvements to reduce environmental impact while improving propulsive efficiencies.

SUMMARY

A propulsion system for an aircraft according to an exemplary embodiment of this disclosure, among other possible things includes a core engine that includes a core flow path where air is compressed in a compressor section, communicated to a combustor section, mixed with a hydrogen based fuel and ignited to generate a high energy gas flow that is expanded through a turbine section. A hydrogen fuel system is configured to supply hydrogen fuel to the combustor through a fuel flow path. A condenser is arranged along the core flow path and is configured to extract water from the high energy gas flow. The condenser includes a plurality of spiral passages that are disposed in a collector. The spiraling passages are configured to receive the high energy gas flow and to generate a transverse pressure gradient to direct water out of the high energy gas flow toward the collector. An evaporator is arranged along the core flow path and is configured to receive a portion of the water extracted by the condenser to generate a steam flow. The steam flow is injected into the core flow path upstream of the turbine section.

In a further embodiment of the foregoing, the condenser is configured to receive a cooling flow to cool the high energy gas flow.

In a further embodiment of any of the foregoing, the condenser is configured to receive the cooling flow at a location along an outer periphery of the spiral passages.

In a further embodiment of any of the foregoing, the plurality of spiral passages are defined between a plurality of curved layers that extend axially and curve about a condenser axis.

In a further embodiment of any of the foregoing, the plurality of curved layers include openings that are configured to exhaust water that is collected from the high energy gas flow to the collector.

In a further embodiment of any of the foregoing, the condenser includes a plurality of axial passages that are forward of the plurality of spiral passages and a transition region therebetween for directing inlet high energy gas flow into the spiral passages.

In a further embodiment of any of the foregoing, the condenser includes a plurality of cooling flow passages that extend axially along a condenser axis and each of the plurality of spiraling passages wrap around at least one of the cooling flow passages.

In a further embodiment of any of the foregoing, each of the plurality of spiral passages include a condensate opening that communicates water that is extracted from the high energy gas flow with the collector.

In a further embodiment of any of the foregoing, the propulsion system includes an inlet manifold that is configured to direct the high energy gas flow into the plurality of spiral passages and the cooling flow into the plurality of cooling flow passages.

In a further embodiment of any of the foregoing, the plurality of spiral passages include a hydrophilic coating.

In a further embodiment of any of the foregoing, the plurality of spiral passages include a hydrophobic coating.

In a further embodiment of any of the foregoing, the plurality of spiral passages include a textured surface.

In a further embodiment of any of the foregoing, the propulsion system includes a water storage tank and the collector that is configured to communicate water that is extracted from the high energy gas flow to the water storage tank.

A water recover system for an aircraft propulsion system, the water recovery system according to an exemplary embodiment of this disclosure, among other possible things includes a condenser that is arranged within a flow path of the propulsion system for a high energy gas flow and is configured to extract water from the high energy gas flow. The condenser includes a plurality of spiral passages that are disposed in a collector. The spiraling passages include condensate openings and are configured to receive the high energy gas flow and generate a transverse pressure gradient to direct water out of the high energy gas flow, through the condensate openings into collector. A water storage tank is in communication with the collector that is configured to receive water that is extracted from the high energy gas flow to the water storage tank. The water recovery system further includes at least one water pump for communicating water from the water storage tank to the propulsion system.

In a further embodiment of the foregoing, the condenser is configured to receive a cooling flow to cool the high energy gas flow within the plurality of spiral passages.

In a further embodiment of any of the foregoing, the plurality of spiral passages is defined between a plurality of curved layers that extend axially and curve about a condenser axis.

In a further embodiment of any of the foregoing, the condenser includes a plurality of cooling flow passages that extend axially along a condenser axis and each of the plurality of spiraling passages wrap around at least one of the cooling flow passages.

In a further embodiment of any of the foregoing, the plurality of spiral passages includes at least one of a hydrophilic coating, a hydrophobic coating or a textured surface.

A method of operating an aircraft propulsion system according to an exemplary embodiment of this disclosure, among other possible things includes generating a high energy gas flow that includes water, removing water from the high energy gas flow with a condenser that is disposed in a flow path downstream from a combustor, generating a steam flow from water that is removed from the high energy gas flow with an evaporator that is located within the flow path upstream of the condenser and downstream of the combustor, and injecting the generated steam with a core flow path.

In a further embodiment of the foregoing, the steam is injected into the core flow path upstream of the combustor.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 4 is a schematic view of another example condenser embodiment.

FIG. 5 is a perspective view of a portion of an example coated surface.

FIG. 6 is side view of a portion of the example coated surface.

FIG. 7 is a perspective view of an example textured surface.

FIG. 8 is a side view of a portion of the example textured surface.

DETAILED DESCRIPTION

Figure 1:
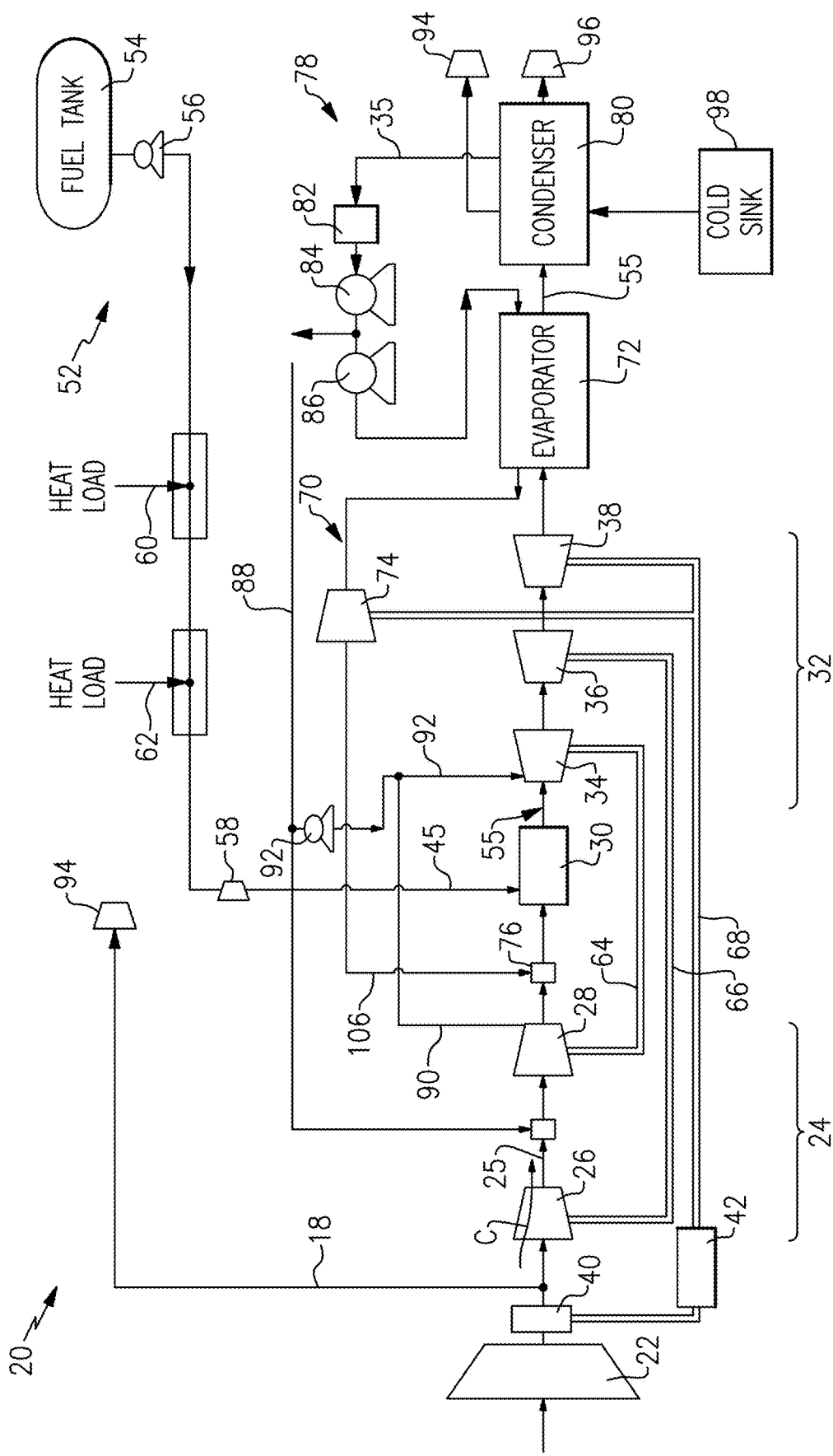
FIG. 1 is a schematic view of an example propulsion system embodiment.

FIG. 1 schematically illustrates an example hydrogen steam injected intercooled turbine engine that is generally indicated at 20. The engine 20 includes core engine with a core airflow path C through a fan 22, a compressor section 24, a combustor 30 and a turbine section 32. The fan 22 drives inlet air as a core flow 25 into the compressor section 24. In the compressor section 24, the core flow 25 is compressed and communicated to a combustor 30. In the combustor 30, the core flow 25 is mixed with a hydrogen ($H_2$) fuel flow 45 and ignited to generate a high energy gas flow 55 that expands through the turbine section 32 where energy is extracted and utilized to drive the fan 22 and the compressor section 24. A bypass flow 18 may flow through the fan 22, bypass the remaining components of the engine 20, and exit through a fan nozzle 94. The high energy gas flow 55 is exhausted from the turbine section 32 and communicated to a steam generation system 70 and a water recovery system 78 before being exhausted through a core nozzle 96.

The engine 20 is configured to burn hydrogen provide by a fuel system 52. The fuel system 52 includes a liquid hydrogen ($LH_2$) tank 54 in communication with at least one pump 56. The pump 56 drives a fuel flow 45 to the combustor 30. $LH_2$ provides a thermal heat sink that can be utilized to cool various heat loads within the aircraft indicated at 60 and in the engine as indicated at 62. The heat loads may include, for example and without limitation, super conducting electrics, a working fluid of an environmental control system of the aircraft, an air conditioning heat exchanger, and engine working fluid heat exchangers. Heat accepted into the hydrogen fuel flow increase the overall fuel temperature prior to injection into the combustor 30.

A hydrogen expansion turbine 58 may be provided to reduce the pressure of the $LH_2$ fuel flow through expansion prior to communication to the combustor 30. Expansion in the expansion turbine 58 provides for the temperatures and pressures of the fuel flow to enter the combustor 30 as a gas and not a liquid.

The steam injection system 70 uses the exhaust heat to generate a steam flow 106 by evaporating high pressure water through an evaporator 72. The generated steam 106 may then be injected into compressed core airflow at a location 76 for communication into the combustor 30 to improve performance by increasing turbine mass flow and power output without additional work required by the compressor section. In one example embodiment the location 76 is upstream of the combustor 30. Steam flow from the evaporator 72 may drive a steam turbine 74 to provide an additional work output prior to injection into the combustor 30.

The water recovery system 78 draws water, schematically indicated at 35, from the high energy gas flow 55 and communicates the recovered water to water storage tank 82. The water storage tank 82 operates as an accumulator to provide sufficient water for operation during various engine operating conditions. A condenser/water separator 80 is provided downstream of the turbine section 32 and the evaporator 72. The condenser/separator 80 is in communication with a cold sink, schematically indicated at 98 for the condenser/separator 80 may be, for example, ram or fan air depending on the application and/or engine configuration.

The engine 20 has an increased power output from the injected steam 106 due to an increasing mass flow through the turbine section 32 without a corresponding increase in work from the compressor section 24. An example engine operation cycle may include up to (or more than) 35% steam-air-ratios (SAR) and may be assisted by a multiple fold (e.g., 2×, 3×, etc.) increase in moisture from burning $H_2$ as the fuel.

The water recovery system 78 includes the water storage tank 82 that receives water from the condenser/water separator 80 and provides for the accumulation of a volume of water required for production of sufficient amounts of steam. Water recovered from the exhaust gas flow is driven by a low pressure pump 84 and a high pressure pump 86 to the evaporator 72.

A water intercooling flow 88 may be communicated to the compressor section 24 to reduce a temperature of the core airflow 25 and increase mass flow. Reduced temperatures and increased mass flow provided by injection of water increases compressor efficiency. Water may also be used as a cooling flow 92 to cool cooling air flow 90 communicated from the compressor section 24 to the turbine section 32.

The example compressor section 24 includes a low pressure compressor (LPC) 26 and a high pressure compressor (HPC) 28. The turbine section 32 includes a high pressure turbine (HPT) 34, an intermediate pressure turbine (IPT) 36, and a low pressure turbine (LPT) 38. The turbines 34, 36 and 38 are coupled to a corresponding compressor section. In this disclosed example, the high pressure turbine is coupled by a high shaft 64 to drive the high pressure compressor 28. An intermediate shaft 66 couples the intermediate turbine 36 to the low pressure compressor 26.

A low shaft 68 is coupled to the low pressure turbine 38 and a gearbox 40 to drive the fan 22. The low shaft 68 may further be coupled to an electric machine 42 that is configured to impart and/or extract power into the low shaft 68.

The example gearbox 40 is an epicyclical gear train, such as a planetary gear system, star gear system or other known gear system, with a gear reduction ratio of greater than about 2.3.

Although the example engine 20 is described and shown by way of example as a three spool engine, other engine configurations, such as two-spool may also benefit from this disclosure and are within the contemplation and scope of this disclosure.

Figure 2:
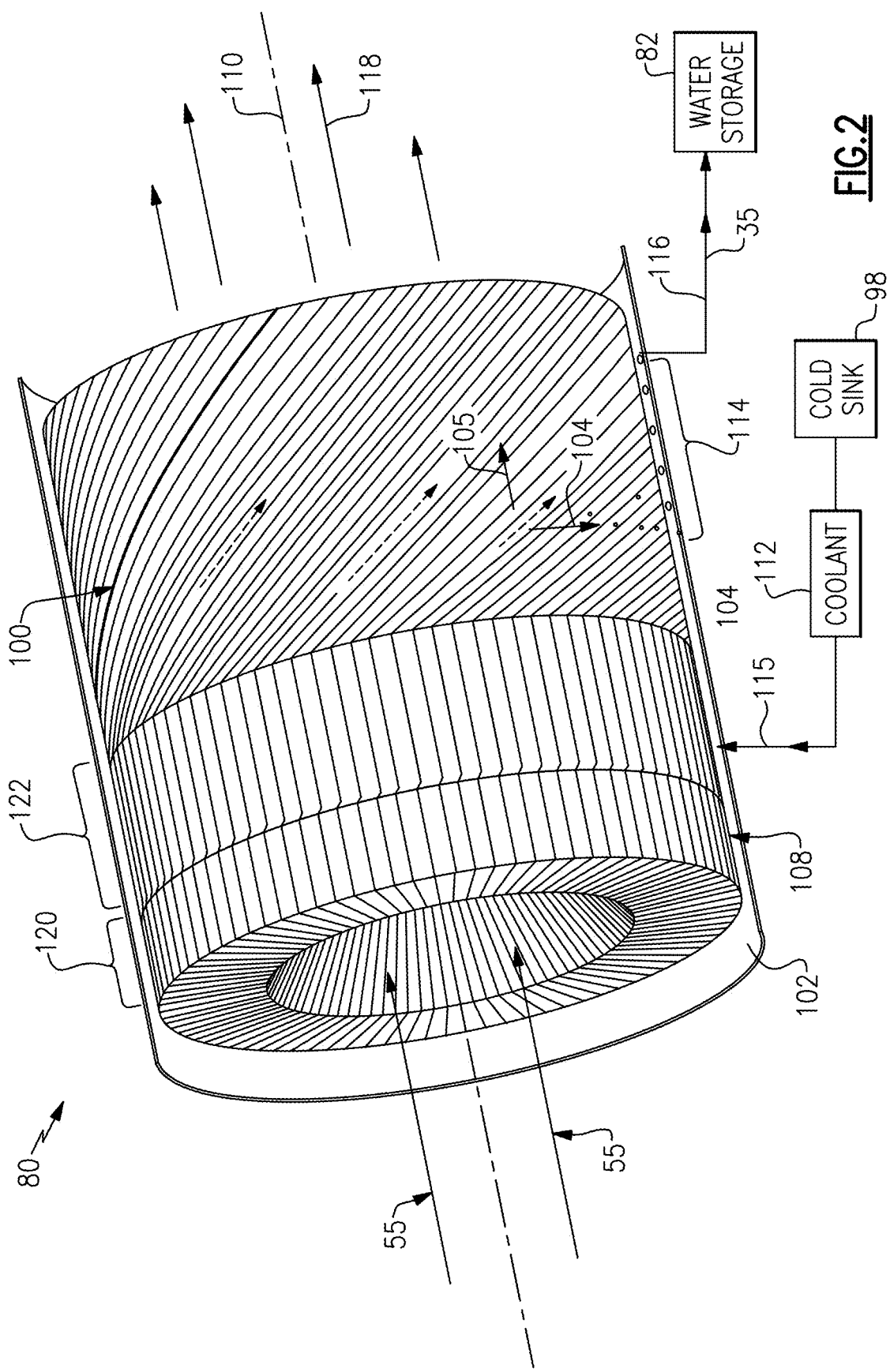
FIG. 2 is a schematic view of an example condenser embodiment.

Referring to FIG. 2, with continued reference to FIG. 1, the example condenser/water separator 80 is schematically shown and includes a plurality of spiral passages 100 disposed within a collector 102. The spiral passages 100 receive the high energy gas flow 55 along a condenser axis 110. A cooling flow 115 is communicated from a coolant source 112 along an outer periphery 108 of the condenser 80. In this example disclose embodiment, the condenser 80 is circularly shaped such that the outer periphery 108 is an outer diameter of the spiral passages 100.

The collector 102 surrounds the outer periphery 108 of the condenser 80 and is in communication with a water passage 116. Water that is drawn out of the gas flow 55 flows outwardly within the collector 102 as schematically indicated at 114. The outward flow of water 114 is directed to the passage 116 and ultimately to the water storage tank 82. The collector 102 may include integral features that provide for guiding and directing of the water 114 toward outlet or outlets in communication with the passage 116. The remaining gas flow 55 is exhausted as indicated at 118.

The spiral passages 100 induce a spiral swirling flow of the inlet gas flow 55. The spiral flow induces a centrifugal force on water within the gas flow 55. As is schematically shown, swirling gas flow 55 within the spiral passages 100 has an axial component 105 and a transverse component 104. The transverse component 104 is generated due to transverse pressure gradients induced by the induced swirling flow.

The condenser 80 includes an axial portion 120 that initially receives the gas flow 55 and a transition portion 122. The transition portion 122 introduces a swirl into the flow that is than further enhanced by the spiral passages 100. The coolant flow 106 may remain along an outer periphery or may be communicated to the spiral passages 100. In one example embodiment, the coolant flow 106 and the gas flow 55 are maintained within separate and adjacent spiral passages. The coolant flow 106 absorbs heat from the gas flow 55 that provides for water to form a liquid condensate that is communicated as the water flow 114 to the passage 116.

Figure 3:
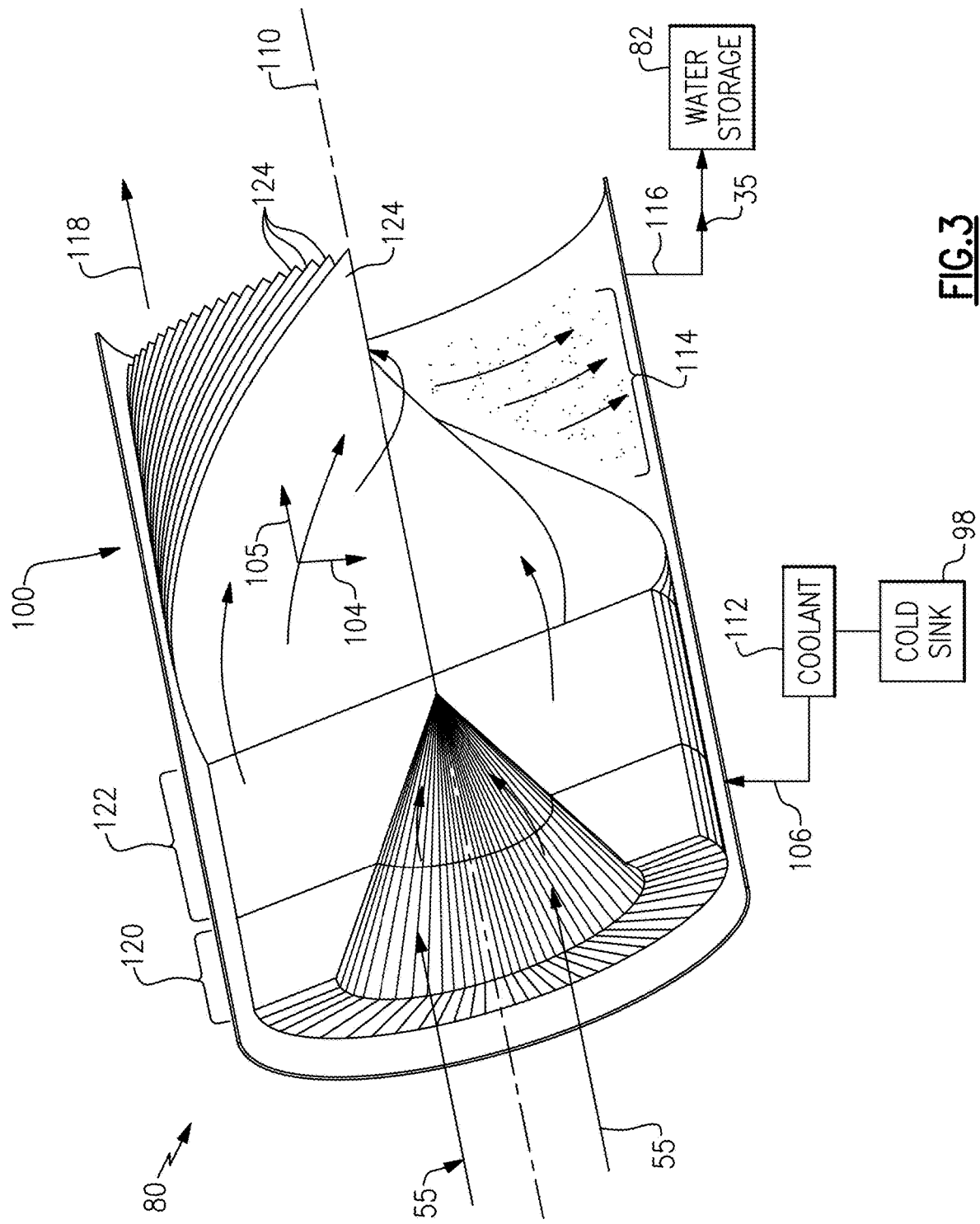
FIG. 3 is a partial cross-section of the example condenser embodiment.

Referring to FIG. 3, with continued reference to FIG. 2, the example spiral passages 100 are formed from a plurality of layers 124 that spiral axially about the condenser axis 110. The layers 124 may be thin sheets of metal that are formed to define the spiral passages in spaces therebetween. The layers 124 are sized to provide a desired gas flow and swirl designed to extract a predefined water flow 114.

The example condenser 80 may be sized to encompass all of the gas flow path aft of the turbine section 32 or may only take up a portion of the gas flow path. Moreover, although a single condenser 80 is shown and described by way of example, several condensers 80 may be arranged within the gas flow path to extract water for use in the propulsion system. Moreover, those multiple condensers could be arranged about a periphery of the gas flow path.

Referring to FIG. 4, another example condenser 130 is schematically shown and includes an intake manifold 138 that communicates coolant flow 115 and the gas flow 55 separately. The condenser 130 includes a plurality of axially extending passages 132 for the coolant flow 106. A corresponding plurality of spiral passages 134 wraps about each of the axial coolant passages 132. Coolant within the axial passages 132 cools hot gases 55 to transform water into a liquid condensate form and then is exhausted as shown at 126. The outflow of coolant 126 may be exhausted with the exhausted airflow 118 or communicated back to the coolant reservoir 112. The liquid condensate is heavier than the gas and therefore is driven radially outward by the swirling flow imparted by the spiral passages 134. The outward swirl induced in the gas and liquid drives the liquid water 114 through a plurality of condensate openings 136. Water that is exhausted through the condensate openings 136 is collected by a collector 142 disposed about an outer periphery of the condenser 130.

The spiral passages 134 may be formed from sheet metal material, as a cast part or by additive manufacturing processes. Moreover, it should be appreciated that it is within the contemplation and scope of this disclosure that the example condenser 130 may be formed using other manufacturing and assembly processes.

Referring to FIGS. 5 and 6, surfaces 142 of the spiral passages 100, 134 may be provided with a coating 140 that aids in the condensation of water from the gas flow 55. In one disclosed example embodiment, the coating 140 comprise a hydrophilic material. In another disclosed example embodiment, the coating 140 comprises a hydrophobic material. Still in another disclosed example embodiment, the coating 140 may be a pattern of alternating sections made from a hydrophobic material and other sections including hydrophilic material to drive and gather condensate from the gas flow 55.

Referring to FIGS. 7 and 8, surfaces 144 within the example condensers 80, 130 may be textured to enhance thermal transfer into the gas flow 55. In one disclosed example, the surfaces 144 include a texture 146 formed from a plurality of raised bumps. The texture 146 may be configured to induce a turbulent flow near the surfaces 144 to enhance thermal transfer and thereby accelerate cooling and liquid extraction.

It should be appreciated, that the surfaces 142 and 144 may be portions of the layers 124 within the condenser 80 or the spiral passages 134 of the condenser 130.

The example condensers 80, 130 provide for the transformation of water in gas form within the gas flow into liquid water that is then separated and stored for injection back into the engine to improve overall propulsive system efficiency.

Although an example engine configuration is described by way of example, it will be appreciated that other engine configurations may include additional structures and features and are within the contemplation and scope of this disclosure.

Accordingly, the disclosed assemblies provide for the advantageous use of ammonia fuel to improve engine efficiency and reduce carbon emission. The disclosed systems use the advantageous thermal capacity of ammonia to maximize the recapture of heat and cool other working flows of the engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
a core engine including a core flow path where air is compressed in a compressor section, communicated to a combustor section, mixed with a hydrogen fuel and ignited to generate a high energy gas flow that is expanded through a turbine section;
a hydrogen fuel system configured to supply the hydrogen fuel to the combustor through a fuel flow path;
a condenser arranged along the core flow path and configured to extract water from the high energy gas flow, the condenser including a plurality of axial passages receiving the high energy gas flow along a condenser axis, a transition region that introduces a swirl into the high energy gas flow received from the plurality of axial passages, and a plurality of spiral passages, a collector is in communication with a water passage, wherein the plurality of axial passages, the transition region and the spiral passages are aligned sequentially along the condenser axis radially inward of an outer periphery of the collector, and the plurality of spiral passages are configured to receive the high energy gas flow and generate a transverse pressure gradient to direct the water out of the high energy gas flow radially outward toward the collector; and
an evaporator arranged along the core flow path and configured to receive a portion of the water extracted by the condenser to generate a steam flow, wherein the steam flow is injected into the core flow path upstream of the turbine section.

2. The propulsion system as recited in claim 1, wherein the condenser is configured to receive a cooling flow to cool the high energy gas flow.

3. The propulsion system as recited in claim 2, wherein the condenser is configured to receive the cooling flow at a location along an outer periphery of the spiral passages.

4. The propulsion system as recited in claim 2, wherein the plurality of spiral passages are defined between a plurality of curved layers extending axially and curving about the condenser axis.

5. The propulsion system as recited in claim 4, wherein the plurality of curved layers include openings configured to exhaust the water collected from the high energy gas flow to the collector.

6. The propulsion system as recited in claim 2, wherein the condenser includes a plurality of cooling flow passages that extend axially along a condenser axis and each of the plurality of spiral passages wrap around at least one of the plurality of cooling flow passages.

7. The propulsion system as recited in claim 6, wherein each of the plurality of spiral passages include a condensate opening for communicating the water extracted from the high energy gas flow with the collector.

8. The propulsion system as recited in claim 7, including an inlet manifold configured to direct the high energy gas flow into the plurality of spiral passages and the cooling flow into the plurality of cooling flow passages.

9. The propulsion system as recited in claim 1, wherein the plurality of spiral passages include a hydrophilic coating.

10. The propulsion system as recited in claim 1, wherein the plurality of spiral passages include a hydrophobic coating.

11. The propulsion system as recited in claim 1, wherein the plurality of spiral passages include a textured surface.

12. The propulsion system as recited in claim 1, including a water storage tank and the collector is configured to communicate the water extracted from the high energy gas flow to the water storage tank.

13. The propulsion system as recited in claim 1, wherein a cooling flow is directed along the outer periphery of the condenser.

14. The propulsion system as recited in claim 1, wherein a cooling flow and the high energy gas flow are directed through separate and adjacent ones of the plurality of spiral passages.

15. The propulsion system as recited in claim 1, wherein the plurality of spiral passages includes an aft end where the high energy gas flow is exhausted axially from the plurality of spiral passages.

16. The propulsion system as recited in claim 1, wherein the plurality of spiral passages extend axially from the transition region along the condenser axis.

* * * * *